United States Patent [19]

Ihmels et al.

[11] Patent Number: 4,562,965
[45] Date of Patent: Jan. 7, 1986

[54] COMPRESSED FLUID SPRAYING PISTOL

[76] Inventors: Manfred Ihmels, Layestr. 1a, 2905 Edewecht; Hartmut Ihmels, Hauptstr. 23, Edewecht, both of Fed. Rep. of Germany

[21] Appl. No.: 336,386
[22] PCT Filed: Apr. 28, 1981
[86] PCT No.: PCT/DE81/00068
  § 371 Date: Dec. 28, 1981
  § 102(e) Date: Dec. 28, 1981
[87] PCT Pub. No.: WO81/03131
  PCT Pub. Date: Nov. 12, 1981

[30] Foreign Application Priority Data

Apr. 29, 1980 [DE] Fed. Rep. of Germany ....... 3016419

[51] Int. Cl.$^4$ ............................................. B05B 7/30
[52] U.S. Cl. ..................................... 239/346; 239/375
[58] Field of Search .............. 239/346, 345, 302, 375, 239/376, 377, 378, 379, 304, 309, 142, 526, 85; 222/461, 462; 366/244, 245, 247

[56] References Cited

U.S. PATENT DOCUMENTS 3,003,704 10/1961 Roche ............................. 239/378 X
3,236,459  2/1966 McRitchie ....................... 239/376 X

FOREIGN PATENT DOCUMENTS 0000523 of 1909 United Kingdom ................ 239/345

Primary Examiner—Andres Kashnikow
Assistant Examiner—James R. Moon, Jr.
Attorney, Agent, or Firm—Charles Hieken

[57] ABSTRACT

A compressed fluid spraying pistol includes a central nozzle for ejecting a spraying medium, a tank for holding the spraying medium, a jet needle for opening and closing the nozzle, and a connecting channel between the nozzle and the tank. The nozzle, tank, jet needle, and connecting channel form a foot-like exchangeable member insertable within a slipper-shaped housing within the body of the pistol. The spraying medium includes a product to be sprayed and a hardener, separately contained within the tank.

10 Claims, 8 Drawing Figures

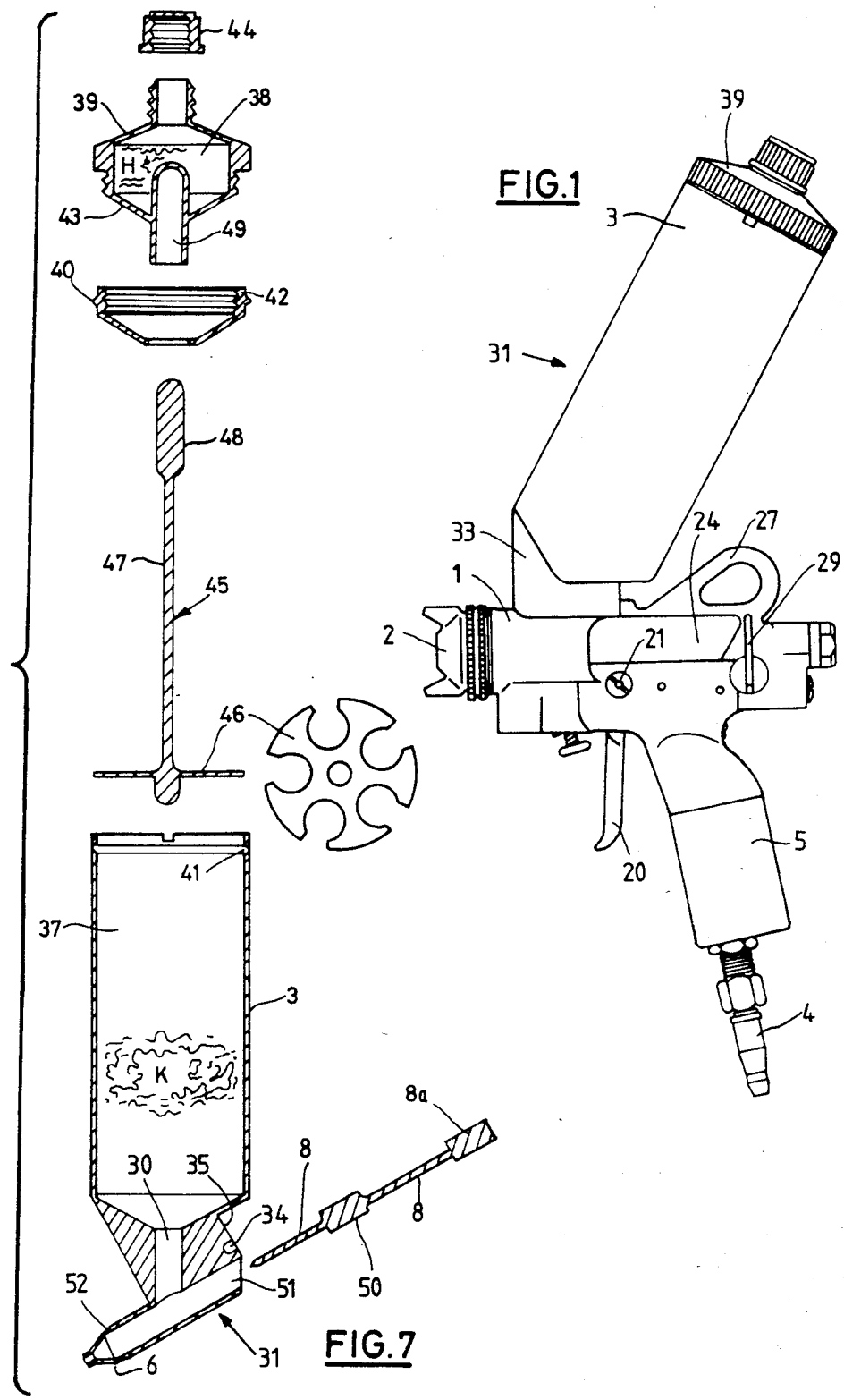

COMPRESSED FLUID SPRAYING PISTOL

STATE OF ART

In conventional spraying pistols according to the head part of claim 1 the nozzle ejecting the spray substance is an integral part of the body of the pistol with its spraying head and said body is provided with a threaded pipe for screw connection to a tank for the spray substance. Plastics as spray substance for a quick hardening after spraying on are intensively mixed immediately before spraying with a hardening agent. After operation the pistol as well as the tank must be cleaned thoroughly to hinder contamination and occlusion by hardening of the spraying substance. This work is circumstantial and time-consuming. Furthermore, essential difficulties often result from slovenly cleaning.

PROBLEM

The problem of the present invention is to provide a spraying pistol, the application of which is not loaded with problems of cleaning after application.

SOLUTION OF THE PROBLEM

This problem has been solved inventively by that the body of the pistol is provided with a socket arranged concentrically to said nozzle for insertion of said nozzle-tank-units. Thereby, the possibility is given to coordinate the entire surface of the pistol which is wet by the spraying substance to an encasing body which after application can be replaced by an equal unit. Moreover, it is possible to construct such a unit so simple and inexpensive that it is possible to renounce the repeated use and to throw it away after consumption of its contents, although it may be possible to deliver such emptied units to a cleaning procedure which may be performed independent of the unit of work.

The inventive encasing unit besides the tank for the spraying substance encloses the spraying nozzle which is connected to it. Both parts may be integrated into a one-piece body preferably made of plastics. In order to open it, the nozzle may be provided with a needle which is shiftable into its open position against the pressure of a closing spring. Preferably the body of the pistol is provided with a slipshoe-like seat (slipper seat) as socket for the insertion of the encasing unit with its foot which is provided with an adequate foot with a sole and heel. This seat may have a stop for the front side of the nozzle part. For application the user has merely to insert the encasing unit which is delivered with the spraying substance and has to bring in the hardening agent before application. For this purpose a portion of a hardening agent may be added within an auxiliary receptacle. Preferably the encasing unit is formed in such a manner that the auxiliary receptacle is attached to it. The cover of the tank may serve as a bracket for the auxiliary receptacle.

DESCRIPTION OF AN EMBODIMENT

An embodiment of the invention is shown in the accompanying drawings, wherein

FIG. 1 is showing a side view of a spraying pistol according to the invention,

Figures 2, 3, 4, 5, 6, 8:
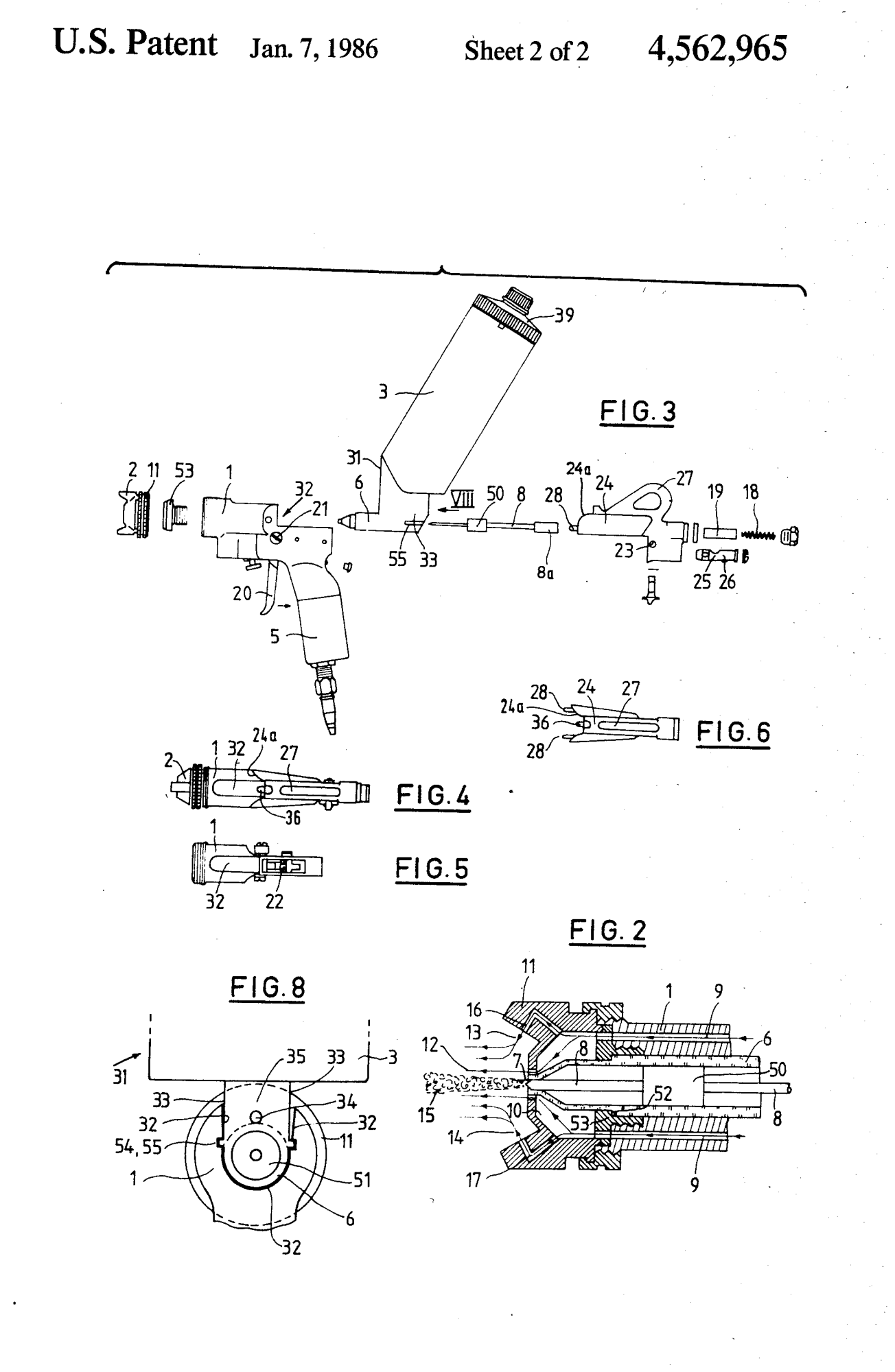

FIG. 2 in a larger scale a square section of a spraying head of the pistol as shown in FIG. 1, FIG. 3 the pistol of FIG. 1 in exploded view, FIG. 4 a top view of the pistol in FIG. 1, without spray-substance-inset, FIG. 5 a top view of the pistol-body in FIG. 3, FIG. 6 a top view of the looking cap in FIG. 3, FIG. 7 an exploded view of the inset, and FIG. 8 in a larger scale a partial front view of the pistol in FIG. 1.

The spraying pistol shown in the drawing serves for application of hardening fluids (spraying substances) and especially a mixture of plastics and a hardening agent onto surfaces by help of a spraying nozzle 6 which is connected to a tank 3 for the spraying substance. It consists essentially of a pistol body 1 with a spraying head 2 which is connected to the tank for the spraying substance and is connectable to a compressed-air source by a feed pipe 4.

The spraying head 2—see especially FIG. 2—includes the nozzle 6, the jet orifice 7 of which in state of rest is closed by the tip of a nozzle needle 8 and is opened by drawing backwards said needle. Within the body 1 channels 9 are provided which join into a distribution chamber 10 surrounding the front end of nozzle 6. This chamber 10 is formed by the front surface of body 1 and a screw cap 11 having a central bore forming an annular opening to produce a concentrical atomizing ray 12 for the enclosed central jet of spraying substance. The circular spray jet may be shaped to a flat-section jet 15 with more or less extension within a plan vertically to the drawing plane and adjustable inclination to the plane of symmetry. For this the screw cap 11 is provided with auxiliary channels 16,17 directed from opposite sides towards the circular jet from the nozzle.

A spring 18 is pressing a bolt 19 against the head at the backside of nozzle needle 8. By swiveling movement of a handle 20 in direction of arrow around an axle 21 and swiveling movement of a fork 22 coupled to handle 20, needle 8 may be retracted against spring 18 thereby opening the jet orifice 7.

With operating of handle 20 a needle valve within the channel from feed pipe to the spraying head is opened, preferably with a certain leading so that the compressed-air stream begins even before opening of nozzle 6.

Spring 18 and bolt 19 are arranged within a separate part 24 which is hinged around an axle 23 and can be withdrawn on a rod 25 with limit stop backwards from body 1 and can be folded down around said rod 25 in such a manner that the nozzle needle 8 can be retracted backwards out of nozzle 6. This separate part 24, which generally is named "locking cap", is provided with a handle 27; it can be secured in its operating position by guide-pins 28 engaging holes of body 1 and moreover by a locking device with tensioning lever 29.

So far the construction is in conformity with the conventional construction of modern spraying pistols as are shown for instance in DE No. 2,412,743.

Inventively the entirety of all parts encasing and leading the spraying substance are forming an integrated enveloping body forming a replaceable inset 31 consisting of tank 3, nozzle 6 with needle 8 and a connecting passage 30 between tank 3 and nozzle 6.

Body 1 is provided with a slipper-shaped seat 32 for inset 31 and the connection between tank 3 and nozzle 6 is formed as a foot 33 with sole and heel 35 fit to the seat 32. Operating position of inset 33 is ensured by engagement of a bore hole 34 by a pin 36 on locking cap 24. Nozzle 6 and tank 3 form a replaceable unit. The needle 8 is fixedly connected to the nozzle and is retractable by operation of handle 20. After the contents of tank 3 has been consumed the whole insert is rejected and is returned to the supplier for reuse.

The tank 3 contains a large chamber 37 for plastics K and a small chamber 38 for the hardening agent H which must be brought into the plastics. The small chamber 38 is placed within the cover 39 which for its parts consists of three parts:

first a funnel-like lower part 42, which engages a groove 41 by a locking edge 40, secondly a medium bottle-like part 43 which contains said small chamber 38 and is screwable tightly into the lower part, and thirdly a small upper part 44 which serves as screw cap for the small chamber 38.

For mixing together the plastics K and hardening agent H the tank contains a mixer 45 consisting of a perforated disk 46 with a shaft 47 and a handle 48 received by a sheathe 49 at the bottom of the small chamber 38.

The nozzle needle 8 is provided with a piston 50 sealing the nozzle chamber backwards and holding closed the nozzle against the connecting passage 30 to tank 3 during rest position.

The spraying nozzle 6 is provided with a shoulder 52 engaging a stop 53 which is screwable into the pistol body 1.

Alterations are possible within the scope of this invention.

The flat-section jet 15 can be adjusted to any inclination by help of a divided construction of the screw cap 11.

The locking cap 24 can be utilized unchanged as in conventional spraying pistols eliminating merely the pins 28 which may be substituted by a suitable form of foot 33 and seat 32 as for instance by a groove-and-tongue joint 54,55 as shown in FIG. 8.

We claim:

1. A spraying pistol especially for applying hardening fluids onto surfaces and operated by a pressure medium including a tank for the spraying medium, a spraying head with a distributing chamber surrounding essentially concentrically a nozzle, a jet needle having a piston means, said jet needle contacted by a pull-off for opening the nozzle against the pressure of a closing spring which is supported in a locking cap at the body of the pistol, characterized by that said nozzle with its jet needle and tank together with a connecting channel form an exchangeable medium inset insertable into a seat of the pistol body and is locked by said locking cap with said piston means holding closed said connecting channel in a rest position and opening said connecting channel when said jet needle and said piston means move together to an operating position with said nozzle open allowing said pressure medium to cause hardening fluid to flow from said tank through said connecting channel out the open nozzle.

2. Spraying pistol as defined in claim 1, characterized by that the nozzle with its connecting channel form a foot-like body with its underside as sole and its heel-like backside as heel to which foot-like body is adapted a slipper-shaped seat within the pistol body.

3. Spraying pistol as defined in claim 1 or 2, characterized by that said nozzle and tank and a bridge form a one-piece inset.

4. Spraying pistol as defined in claim 2, characterized by engagement for precise alignment of an inset and seat; namely, an engagement between said foot-like body and said locking cap and another engagement between said foot-like body and said pistol body.

5. A spraying pistol as defined in claim 1 and further comprising a spray medium inset characterized by a small chamber filled with hardening means for being brought into the spray medium before application.

6. A spraying pistol as defined in claim 5 wherein said spray medium inset is characterized by the tank having a cover with a funnel.

7. A spraying pistol as defined in claim 6 wherein said inset is characterized by that said funnel is a detachable lower part of said cover.

8. A spraying pistol as defined in claim 7 wherein said inset is characterized by a mixer with a perforated disk mixing by axial shift, which in its resting position seals the connecting passage to the nozzle.

9. A spraying pistol in accordance with claim 8 wherein said inset is characterized by that the chamber of the nozzle is sealed backwards by said piston means connected to the jet needle in such a manner that the needle is extractable backwards together with said piston.

10. A spraying pistol as defined in claim 9 wherein said inset is characterized by a seal between said tank and said nozzle.

* * * * *